A. M. TAYLOR.
WATERING TROUGH.
APPLICATION FILED OCT. 12, 1914.
1,181,698.
Patented May 2, 1916.
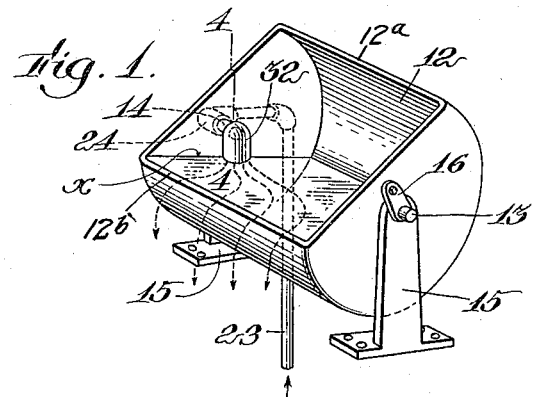
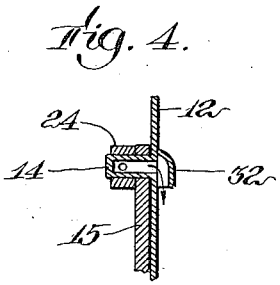
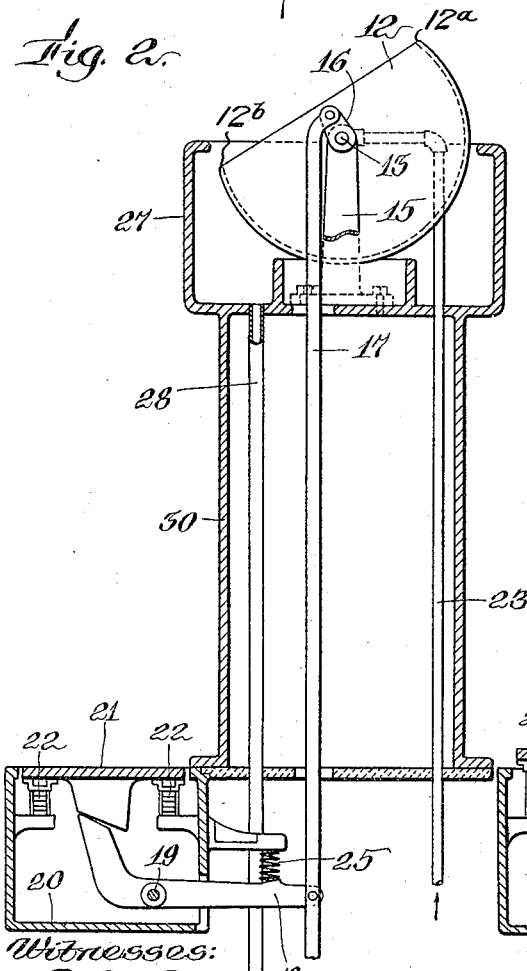
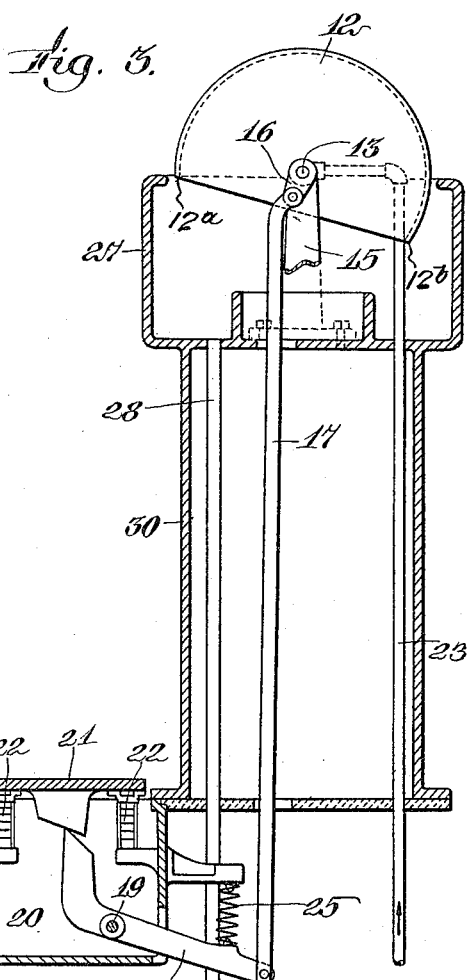
Witnesses:
P. W. Pezzetti
E. P. Brannen
Inventor:
Albert M. Taylor,
by Wright Brown Quinby May
Attorneys.
THE COLUMBIA PLANOGRAPH CO., WASHINGTON, D. C.

UNITED STATES PATENT OFFICE.

ALBERT M. TAYLOR, OF BOSTON, MASSACHUSETTS.

WATERING-TROUGH.

1,181,698.  Specification of Letters Patent.  Patented May 2, 1916.

Application filed October 12, 1914. Serial No. 866,219.

*To all whom it may concern:*

Be it known that I, ALBERT M. TAYLOR, a citizen of the United States, and resident of Boston, Dorchester district, in the county of Suffolk and State of Massachusetts, have invented certain new and useful Improvements in Watering-Troughs, of which the following is a specification.

This invention relates to animal watering apparatus comprising a pivoted trough which is held in an inverted position to discharge its contents when not in use, and is movable to an operative water-retaining position, means being provided for discharging water into the trough when the latter is in its retaining position and the trough being drained or emptied by inversion when its use is no longer required.

A type of apparatus of this character is shown in Letters Patent No. 1,116,858, granted to me November 10, 1914.

The present invention has for its object first to prevent contagion by causing surplus water overflowing from the pivoted trough while in its retaining position to thoroughly remove matter deposited in the trough by an animal drinking therefrom, and secondly to prevent liability of injury to the nose of an animal by the movement of the trough from its inverted position to its retaining position.

The invention consists in the improvements which I will now proceed to describe and claim.

Of the accompanying drawings forming a part of this specification: Figure 1 represents a perspective view of portions of a watering apparatus embodying my invention; Fig. 2 represents a side elevation of the complete apparatus, parts of the supporting structure being shown in section, and the trough being shown arrested in its receiving position; Fig. 3 represents a view similar to Fig. 2, showing the trough inverted; Fig. 4 represents a section on line 4—4 of Fig. 1.

The same reference characters indicate the same or similar parts in all the views.

In the drawings:—12 represents a trough mounted to swing on suitable fixed supports or bearings so that the trough may occupy an inverted discharging position, as shown by Fig. 3, or a retaining position, as shown by Figs. 1 and 2, the mouth of the trough being at the top. The trough is preferably provided with trunnions 13 and 14 mounted to turn in fixed bearings 15. The trunnion 13 is provided with a crank arm 16 which is connected by a rod 17 with one arm of a lever 18 which is pivoted at 19 in a casing 20 forming a chamber below the surface of the ground adjacent to the trough. The fixed bearings 15 are elevated above the surface of the ground to a sufficient extent to permit a horse to conveniently drink from the trough.

21 represents a platform yieldingly supported in a raised position by springs 22 and covering the chamber 20, said platform bearing on one arm of the lever 18.

23 represents a water supply pipe which extends from a point below the surface of the ground upwardly to a sleeve or valve casing 24 surrounding the trunnion 14. Said trunnion is formed as a plug valve having a port which is adapted to register with the port in the casing 24 when the trough is in its water-retaining position, so that water is permitted to flow into the trough.

When the platform 21 is in its normal elevated position, shown by Fig. 3, the lever 18 and the connecting rod 17 are held yieldingly in their normal positions by means of a spring 25 bearing on one arm of the lever 18, the trough being held by the same means in its discharging position. When the fore feet of an animal rest on the platform 21, the latter is depressed and the connecting rod 17 is raised sufficiently to move the trough to its retaining position shown by Figs. 1 and 2.

It will now be seen that when a horse approaches the trough 12 to drink, the trough is automatically turned to and arrested in its water-retaining position, and water is at the same time admitted thereto. When the animal leaves the platform 21, the trough is immediately turned to its discharging position and the water is shut off therefrom, any water remaining in the trough being discharged. The trough is therefore rocked and held alternately in its receiving and discharging positions.

The trough is preferably located in a fixed curb 27, from the bottom of which extends a waste pipe 28 through which the water discharged from the trough is carried away. The bearings 15 may rise from the bottom of the curb 27 and the supply pipe 23 may pass upwardly through said bottom. The curb may be supported by a suitable standard 30.

The apparatus above described resembles that shown in said patent, excepting the following particulars: The trough, instead of being bucket-shaped as heretofore, is preferably a truncated hollow cylinder the axis of which is horizontal and coincides with the trunnions 13 and 14, and is substantially concentric with the periphery of the truncated cylinder. The mouth of the trough formed by truncating the cylinder is so arranged relatively to the crank arm 16 and the trough-rocking means coöperating therewith, that when the trough is arrested in its retaining position its rear edge 12$^a$ is raised considerably above its front edge 12$^b$ and constitutes a curb, the front edge 12$^b$ constituting a depressed spillway. In other words, the mouth is inclined, one edge being higher than the other, the lower edge constituting a movable spillway. This arrangement causes water accumulating in the trough to flow toward and over one edge only of the trough, as indicated by the arrows in Fig. 1, the flow being away from the higher edge and concentrated at the lower edge or spillway, so that any matter deposited in the trough by an animal drinking therefrom is thoroughly removed from the trough and prevented from adhering to any part thereof, and from imparting contagion to other animals subsequently drinking.

The holding capacity of the trough should be such, relatively to the rate of flow of water into it and the rate of consumption by the animal, that the trough will be quickly filled and will overflow more or less continuously while the animal is drinking. If the mouth were horizontal when the trough is in its retaining position, the overflow, instead of being concentrated at one edge, would be distributed over all the edges, and would be relatively feeble, so that floating matter instead of being forcibly removed by the overflow would be liable to adhere to parts of the trough.

The arrangement described and shown enables the trough to be so positioned when not in use that the mouth faces downwardly, so that dust cannot gravitate into the trough. This result is due in part to the inclination of the mouth, the movement of the trough from the position shown by Fig. 2 to that shown by Fig. 3 being through a short arc which is considerably less than a half circle, said movement removing the spillway from its operative position and permitting the emptying of the trough. In case the inclination of the mouth is such that the high water level is below the inlet 14 when water overflows at the lower edge, as shown by Fig. 1, where the line $x$ indicates the high water level, a hood or deflector 32 may be attached to the end of the trough through which the water enters, to change the course of the entering water abruptly and direct it downward, the water being thus prevented from being projected horizontally inward from the inlet above the high water level.

The rear side of the trough, which projects above the high water level when the trough is in its receiving position, constitutes a dust-excluding hood or extension when the trough is in its discharging position. Owing to the fact that the periphery or perimeter of the trough is substantially concentric with the axis of the trough, there is no liability of injurious contact between any part of the trough and the nose of an animal when the trough is moving from the position shown by Fig. 3 to that shown by Fig. 2, whether the trough is guarded by the curb 27, as shown by Figs. 2 and 3, or is not so guarded, as shown by Fig. 1. The nose of an animal whose fore feet are on the platform 21 naturally projects over the trough. The movement of the trough caused by the depression of the platform carries the edge 12$^a$ rearward and the edge 12$^b$ forward and upward. The edge 12$^a$ cannot strike the animal's nose during this movement, and the edge 12$^b$ cannot rise high enough to injuriously strike the animal's nose.

Having described my invention, I claim:

A watering apparatus comprising a supporting structure, a trough pivotally mounted on said structure to rock on a horizontal axis, and having a truncated perimeter which is substantially concentric with said axis, means operated by the weight of an animal approaching the trough for moving the trough to a water-retaining position, and means operative only when the trough is in a retaining position for supplying water thereto, means being provided for normally holding the trough in an inverted emptying and dust-excluding position and for arresting the trough in a water-retaining position, the mouth of the trough being inclined so that one edge is relatively high and constitutes a movable curb and the opposite edge relatively low and constitutes a movable spillway when the trough is in its retaining position, whereby surplus water is caused to flow only toward and over one edge and entirely remove deposited matter from the trough, thus serving to prevent contagion, the concentric arrangement of the perimeter of the trough preventing injurious contact between the edges of its mouth and the nose of an animal projecting over the trough.

In testimony whereof I have affixed my signature, in presence of two witnesses.

ALBERT M. TAYLOR.

Witnesses:
C. F. BROWN,
P. W. PEZZETTI.

Copies of this patent may be obtained for five cents each, by addressing the "Commissioner of Patents, Washington, D. C."